（12）United States Patent
Jackson (10) Patent No.: US 11,745,579 B2
(45) Date of Patent: Sep. 5, 2023

(54) FULL POWER-SHIFT HYBRID TRANSMISSION AND HYBRID TORQUEFILL IN AUTOMATED MANUAL TRANSMISSION

(71) Applicant: Eaton Cummins Automated Transmission Technologies LLC, Galesburg, MI (US)

(72) Inventor: Graeme Andrew Jackson, Kalamazoo, MI (US)

(73) Assignee: Eaton Cummins Automated Transmission Technologies LLC, Galesburg, MI (US)

( * ) Notice: Subject to any disclaimer, the term of this patent is extended or adjusted under 35 U.S.C. 154(b) by 0 days.

(21) Appl. No.: 17/703,496

(22) Filed: Mar. 24, 2022

(65) Prior Publication Data

US 2022/0314781 A1    Oct. 6, 2022

Related U.S. Application Data

(60) Provisional application No. 63/171,060, filed on Apr. 5, 2021.

(51) Int. Cl.
*B60K 6/547* (2007.10)
*B60K 6/365* (2007.10)
(Continued)

(52) U.S. Cl.
CPC .............. *B60K 6/547* (2013.01); *B60K 6/365* (2013.01); *B60K 6/387* (2013.01); *B60K 6/40* (2013.01); *B60K 6/485* (2013.01); *F16H 37/046* (2013.01); *B60K 2006/4825* (2013.01); *B60Y 2200/92* (2013.01); *F16H 2037/048* (2013.01); *F16H 2200/0078* (2013.01)

(58) Field of Classification Search
CPC .......... B60K 6/547; B60K 6/365; B60K 6/40; B60K 6/485; B60K 2006/4825; F16H 37/046; F16H 2037/048; F16H 2200/0078; B60Y 2200/92
See application file for complete search history.

(56) References Cited

U.S. PATENT DOCUMENTS 8,960,033 B2    2/2015    Kaltenbach et al.
9,254,737 B2    2/2016    Kaltenbach et al.
(Continued)

FOREIGN PATENT DOCUMENTS

WO    2020148452 A1 †    7/2020

*Primary Examiner* — Tinh Dang
(74) *Attorney, Agent, or Firm* — Harness, Dickey & Pierce, P.L.C.

(57) ABSTRACT

A hybrid automated mechanical transmission includes an input shaft having a first plurality of gears mounted thereon. The input shaft is configured to be drivingly engaged with an internal combustion engine by an input clutch. A countershaft system includes a second plurality of gears mounted thereon. A main shaft is coaxial with the input shaft and includes a third plurality of gears mounted thereon, the first and third plurality of gears being in driving engagement with the second plurality of gears. A range gear system selectively receives drive input from the main shaft and the countershaft system. An electric motor provides drive torque to one of the countershaft system and the range gear system.

15 Claims, 5 Drawing Sheets

(51) Int. Cl.
  *B60K 6/387*  (2007.10)
  *F16H 37/04*  (2006.01)
  *B60K 6/48*   (2007.10)
  *B60K 6/40*   (2007.10)
  *B60K 6/485*  (2007.10)

(56) References Cited

U.S. PATENT DOCUMENTS

| | | | |
|---|---|---|---|
| 9,403,428 B2 * | 8/2016 | Glueckler | B60W 10/111 |
| 9,597,952 B2 | 3/2017 | Kaltenbach et al. | |
| 9,764,630 B2 | 9/2017 | Kaltenbach et al. | |
| 10,071,622 B2 * | 9/2018 | Kaltenbach | B60W 20/00 |
| 10,538,235 B2 * | 1/2020 | Kaltenbach | B60W 10/08 |
| 10,640,120 B2 | 5/2020 | Kaltenbach et al. | |
| 2003/0221515 A1 † | 12/2003 | Grillo | |
| 2011/0001624 A1 | 7/2011 | Jackson | |
| 2011/0162483 A1 | 7/2011 | Jackson | |
| 2011/0303048 A1 † | 12/2011 | Genise | |
| 2013/0096761 A1 * | 4/2013 | Kuroda | B60L 50/16 |
| | | | 180/65.265 |
| 2014/0144288 A1 * | 5/2014 | Glueckler | B60W 20/00 |
| | | | 903/902 |
| 2019/0000772 A1 | 3/2019 | Preuss et al. | |
| 2019/0077246 A1 | 3/2019 | Preuss et al. | |

\* cited by examiner
† cited by third party

FULL POWER-SHIFT HYBRID TRANSMISSION AND HYBRID TORQUEFILL IN AUTOMATED MANUAL TRANSMISSION

CROSS-REFERENCE TO RELATED APPLICATIONS

This application claims the benefit of U.S. Provisional Application No. 63/171,060, filed on Apr. 5, 2021. The entire disclosure of the above application is incorporated herein by reference.

FIELD

The present disclosure relates to a full power-shift hybrid transmission and hybrid torquefill in an automated manual transmission.

BACKGROUND

This section provides background information related to the present disclosure which is not necessarily prior art.

When combining a hybrid motor to an Automated Mechanical Transmission (AMT) the system can lack the ability to power-shift through all or some of the gear shift events. In other modes the motor has the ability to power-shift, but lacks the ability to provide optimal power due to lack of gear ratio reduction (the motor is typically spinning too slow).

In addition, when an AMT has multiple transmission regimes or ranges (example a 2×3×2 transmission which has a 2-speed range section) it is not possible to power-shift through the range shift. The proposed automated mechanical transmission architectures of the present disclosure solve the above problems.

In addition, a torque fill concept uses an electric motor to provide torque gap observed between required torque (drive cycle torque) and engine provided torque during gearshifts (especially upshifts). Use of motor torque fill in hybrid integrated automated manual transmissions is a novel concept aimed at providing fuel economy benefits as well. Also, the percentage of torque fill, initiation, termination, and control of torque fill is a new strategy described as a part of the present disclosure. The present disclosure solves these two major problems.

SUMMARY

This section provides a general summary of the disclosure, and is not a comprehensive disclosure of its full scope or all of its features.

A hybrid automated mechanical transmission includes an input shaft having a first plurality of gears mounted thereon. The input shaft is configured to be drivingly engaged with an internal combustion engine by an input clutch. A countershaft system includes a second plurality of gears mounted thereon. A main shaft is coaxial with the input shaft and includes a third plurality of gears mounted thereon, the first and third plurality of gears being in driving engagement with the second plurality of gears. A range gear system selectively receives drive input from the main shaft and the countershaft system. An electric motor is selectively engageable to provide drive torque to the countershaft system and the range gear system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
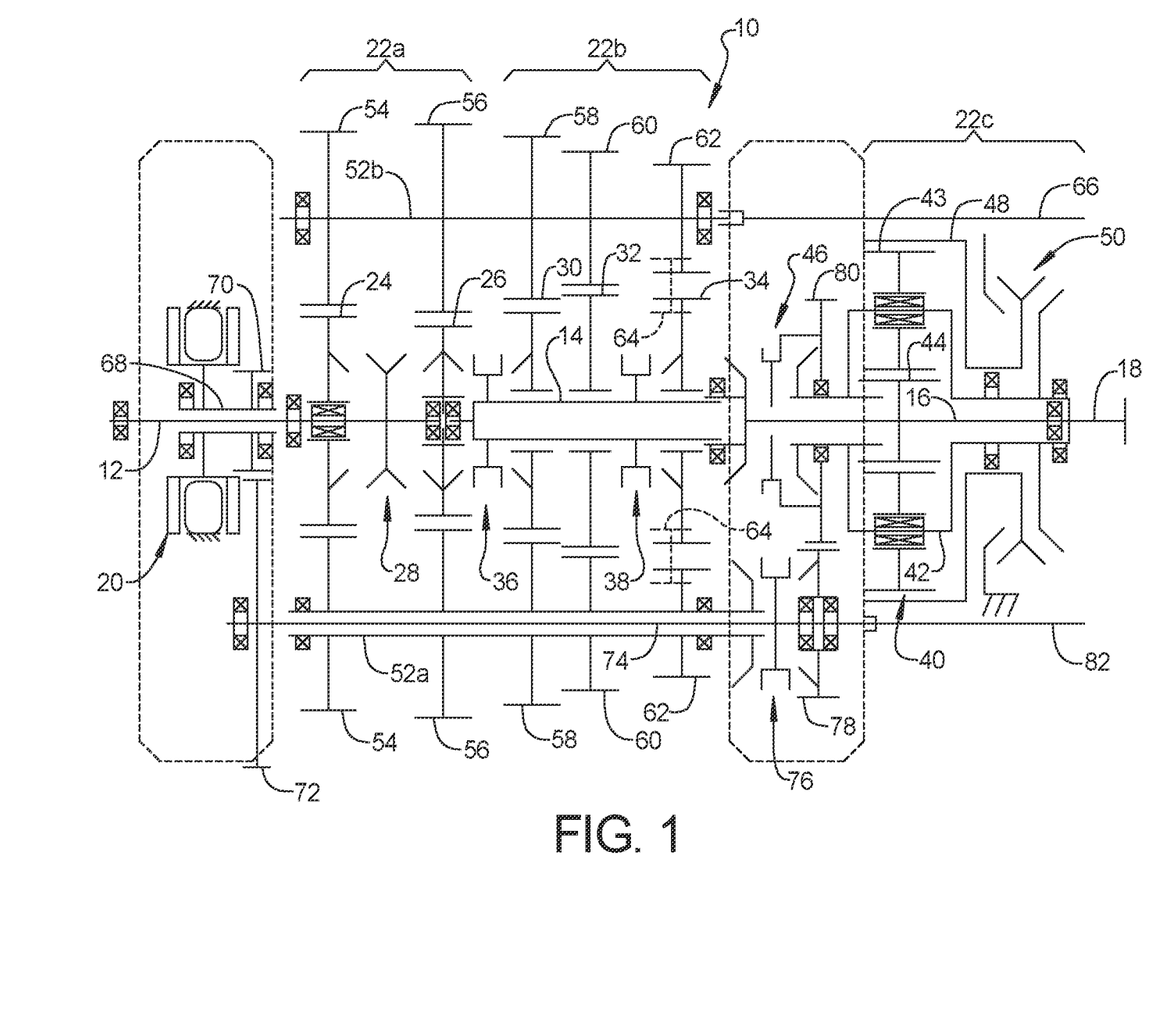
FIG. 1 is a schematic view of a full power-shift hybrid automated manual transmission according to a first embodiment.

FIG. 1 shows a 2×3×2 hybrid automated manual transmission 10 according to the principles of the present disclosure The example transmission 10 is capable of providing power throughput from a prime mover and clutch unit (not shown) to an input shaft 12, from the input shaft 12 to a main shaft portion 14, from the main shaft portion 14 to a range shaft portion 16, and from the range shaft portion 16 to an output shaft assembly 18.

The example hybrid transmission 10 is operable to adjust torque multiplication ratios throughout the transmission and to provide further dive input from an electric motor 20, as will be described in greater detail hereinafter.

With further reference to FIG. 1, the example hybrid transmission 10 includes a splitter section 22a, a main box section 22b and a range gear section 22c to provide multiple gear ratios. The splitter section 22a includes a first splitter gear 24 and a second splitter gear 26 each selectively coupled to the input shaft 12. The inclusion of the splitter gears 24, 26 allow for additional distinct gear ratios provided by the input shaft 24. The splitter gears 24 and 26 can be selectively rotatably engaged with the input shaft 12 by a two-sided synchronizer clutch 28.

The main box section 22b of the example hybrid transmission 10 further includes a number of main box gears 30, 32, 34 selectively coupled to the main shaft portion 14. The main box gear 30 can be rotatably engaged with the main shaft 14 by a second synchronizer clutch 36 which can also engage the splitter gear 26 to the main shaft 14. The main box gears 32 and 34 can be selectively rotatably engaged with the main shaft 14 by a third two-sided synchronizer clutch 38.

The range gear section 22c of the example transmission 10 further includes a planetary gear assembly 40 that couples the range shaft portion 16 to the output shaft assembly 18 through at least two selectable gear ratios between the range shaft portion 16 and the output shaft assembly 18. In particular, as is known in the art, the planetary carrier 42 of the planetary gear assembly 40 supports a plurality of planet gears 43 and can be engaged to the sun gear 44 by a first position of the range clutch 50 to provide a drive ratio of 1:1. In addition, the ring gear 48 can be held stationary or be coupled to the planetary carrier 42 by a second position of the range clutch 50 in order to provide a high or low operating mode. A second clutch 46 independently allows the selectable hybrid drive gear 80 to be engaged to either the shaft portion 16 or carrier 42. This provides low and high ratios of gear 80 to output shaft 18.

The example hybrid transmission 10 further includes two countershafts 52a, 52b, the countershafts 52a, 52b having two aligning gears 54, 56 within the splitter section 22a and drivingly engaged with the respective first and second splitter gears 24, 26 on the input shaft 12. The countershafts 52a, 52b further include three aligning gears 58, 60, 62 within the main box section 22b and drivingly engaged with the respective first, second and third main box gears 28, 30, 32 selectively coupled to the main shaft portion 14. With the two gears in the splitter section 22a, the three gears in the main box section 22b and the two gear ratios provided by the range gear section 22c, the transmission 10 provides a 2×3×2 transmission architecture that is operable to provide 12 practical and functional gear ratios. The number and selection of gears depends upon the desired number of gear ratios from the transmission.

The transmission 10 includes a pair of reverse idler gears 64 that engage with the aligning gears 62 of the countershafts 48a, 48b and with the main box gear 34 of the main shaft portion 26. The countershaft(s) 52a, 52b thereby selectively transmit forward or reverse power between the input shaft 12 and the main shaft portion 14, depending upon which gears are rotationally fixed (via clutches) to the input shaft 12 and/or the main shaft portion 14.

The hybrid transmission 10 can further include a first PTO shaft 66 fixed to the countershaft 52b for rotation therewith. A second PTO shaft 82 can be fixed to the through shaft 74 for operation of the PTO shaft 82 via the electric motor 20.

Figure 2:
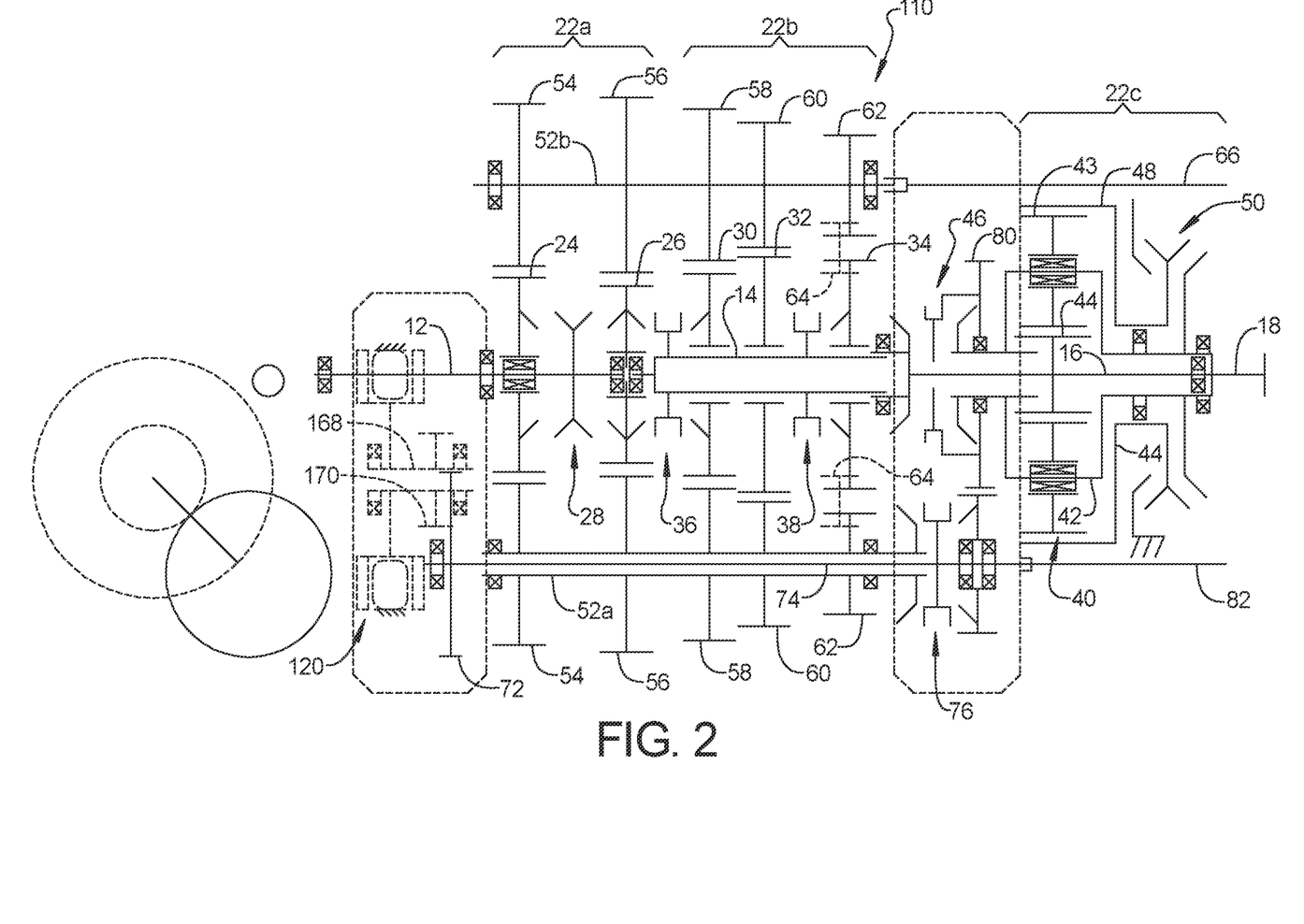
FIG. 2 is a schematic view of a full power-shift hybrid automated manual transmission according to a second embodiment.

According to an alternative embodiment as shown in FIG. 2, a hybrid transmission 110 will be described with an alternative arrangement of the electric motor 120 drive path. The hybrid transmission 110 includes a splitter section 22a, a main box section 22b and a range gear section 22c to provide multiple gear ratios, with substantially the same arrangement as described with reference to FIG. 1. Accordingly, a detailed description of portions of the hybrid transmission 110 that are the same as the previously described hybrid transmission 10 will be omitted.

The electric motor 120 of the hybrid transmission 110 according to the principles of the present disclosure is located at a forward end of the transmission 110, but differs from the embodiment of FIG. 1 in that the electric motor 120 is non-coaxial with the input shaft 12 and includes an output shaft 168 connected to a drive gear 170. The drive gear 170 is in meshing engagement with a driven gear 72 that is fixed to a through shaft 74 that extends through a bore of the countershaft 52a. A clutch 76 is engageable to connect the through shaft 74 to a gear 78 that provides a drive connection to a gear 80. The gear 80 can be drivingly connected to the planetary carrier 42 of the range gear portion 22c. Alternatively, and in addition, the clutch 76 can be engaged to provide a driving connection between the through shaft 74 and the countershaft 52a.

Figure 3:
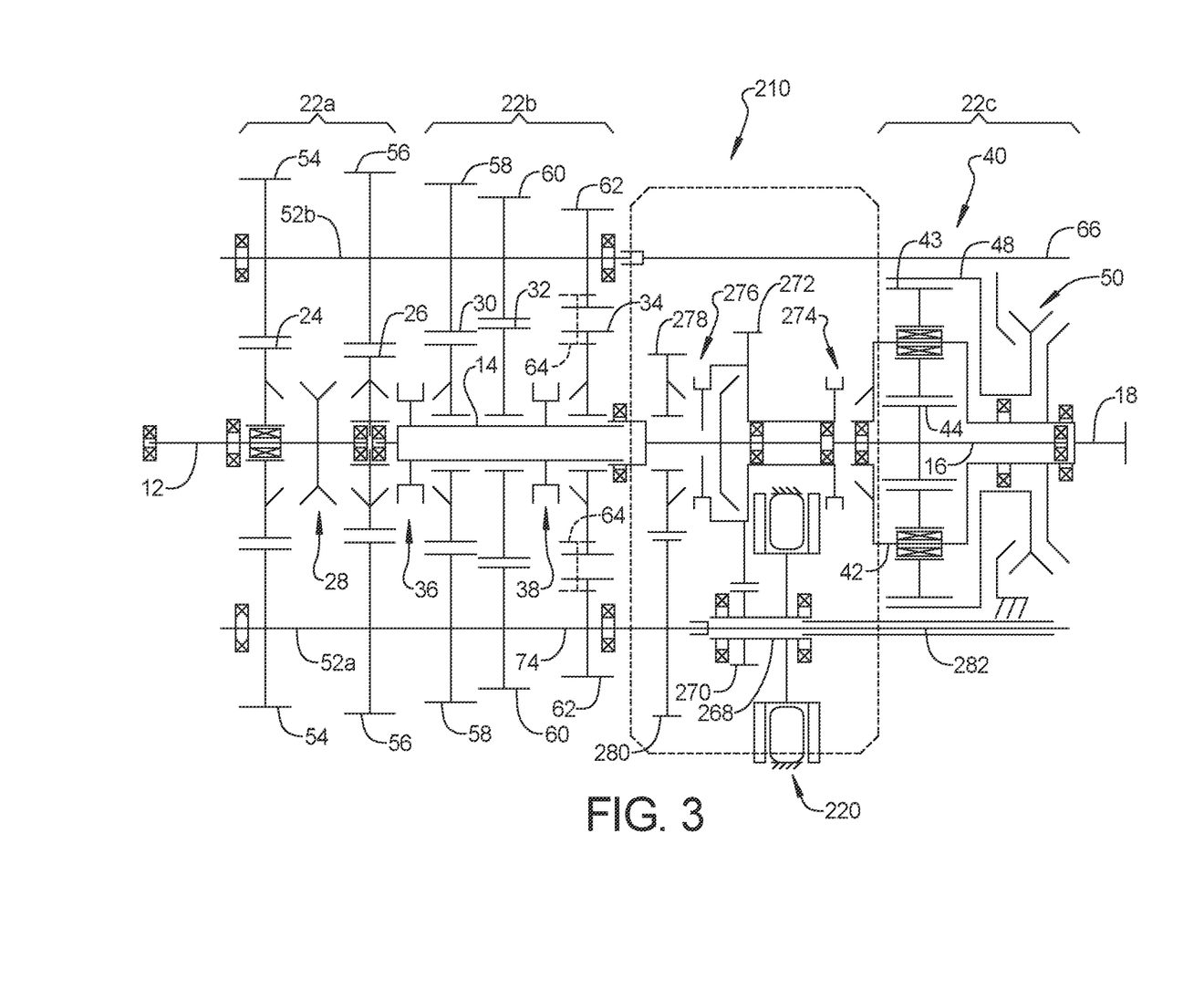
FIG. 3 is a schematic view of a full power-shift hybrid automated manual transmission according to a third embodiment.

According to an alternative embodiment as shown in FIG. 3, a hybrid transmission 210 will be described with an alternative arrangement of the electric motor 220 drive path. The hybrid transmission 210 includes a splitter section 22a, a main box section 22b and a range gear section 22c to provide multiple gear ratios, with substantially the same arrangement as described with reference to FIG. 1. Accordingly, a detailed description of portions of the hybrid transmission 210 that are the same as the previously described hybrid transmission 10 will be omitted.

The electric motor 220 of the hybrid transmission 210 according to the principles of the present disclosure is located at a downstream end of the countershaft 52a. The electric motor 220 includes an output shaft 268 that can be coaxial with the PTO shaft 282 and the countershaft 52a. The motor output shaft 268 is connected to a drive gear 270. The drive gear 270 is in meshing engagement with a driven gear 272. The driven gear 272 can be drivingly connected to the planetary carrier 42 of the range gear portion 22c by a clutch 274. In addition, the electric motor 220 can be connected to the countershaft 52a by a clutch 276 that drivingly connects the gear 272 to a gear 278 that is in meshing engagement with a gear 280 that is fixed to the countershaft 52a can be engaged to provide a driving connection between the through shaft 74 and the countershaft 52a. The PTO shaft 282 can be drivingly connected to the countershaft 52a and an additional PTO shaft 284 can be concentric with the PTO shaft 282 and fixed to the output shaft 268 of the electric motor 220 in order to provide a PTO that is driven by the electric motor 220.

Figure 4:
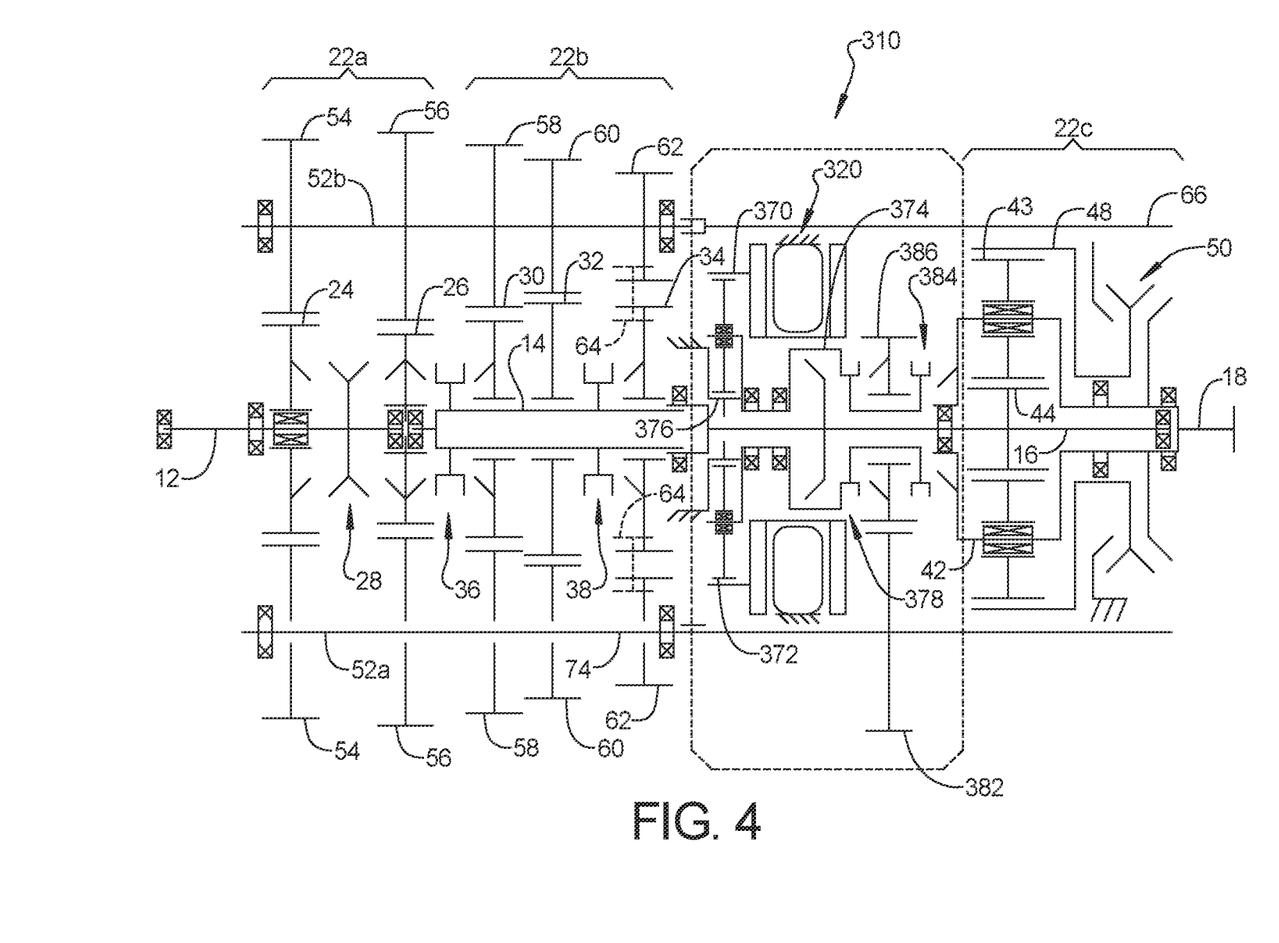
FIG. 4 is a schematic view of a full power-shift hybrid automated manual transmission according to a fourth embodiment.

According to an alternative embodiment as shown in FIG. 4, a hybrid transmission 310 will be described with an alternative arrangement of the electric motor 320 drive path. The hybrid transmission 310 includes a splitter section 22a, a main box section 22b and a range gear section 22c to provide multiple gear ratios, with substantially the same arrangement as described with reference to FIG. 1. Accordingly, a detailed description of portions of the hybrid transmission 310 that are the same as the previously described hybrid transmission 10 will be omitted.

The electric motor 320 of the hybrid transmission 310 according to the principles of the present disclosure is located at a forward end of the range gear section 22c of the transmission 310 and concentric with the range shaft portion 16. The electric motor 320 includes an output in a form of a ring gear 368 of a planetary gear system 370. The ring gear 370 is in meshing engagement with a plurality of planetary gears 372 that are supported on a planet carrier 374. The planetary gears 372 are in further meshing engagement with a fixed sun gear 376. Driving of the ring gear 370 by the electric motor 320 drives the planetary carrier 374. A first clutch 378 is operable to engage the planetary carrier 374 to the range shaft 16 or to a drive gear 380 that is in meshing engagement with a driven gear 382 fixed to the countershaft 352a. A second clutch 384 can engage the planetary carrier 374 to the planetary carrier 42 of the range gear 40.

Figure 5:
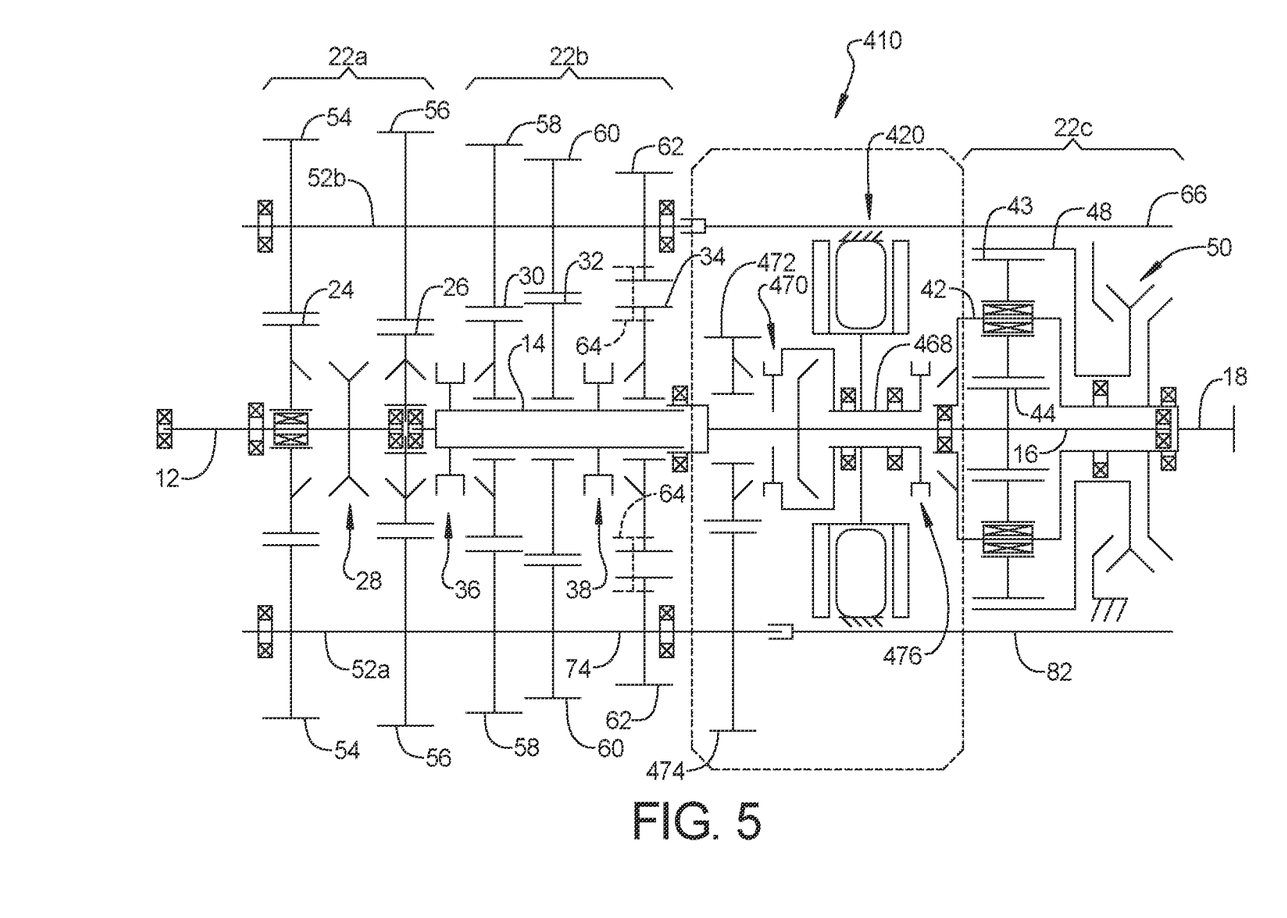
FIG. 5 is a schematic view of a full power-shift hybrid automated manual transmission according to a fifth embodiment.

According to an alternative embodiment as shown in FIG. 5, a hybrid transmission 410 will be described with an alternative arrangement of the electric motor 420 drive path. The hybrid transmission 410 includes a splitter section 22a, a main box section 22b and a range gear section 22c to provide multiple gear ratios, with substantially the same arrangement as described with reference to FIG. 1. Accordingly, a detailed description of portions of the hybrid transmission 410 that are the same as the previously described hybrid transmission 10 will be omitted.

The electric motor 420 of the hybrid transmission 310 according to the principles of the present disclosure is located at a forward end of the range gear section 22c of the transmission 410 and concentric with the range shaft portion 16. The electric motor 420 includes an output shaft 468. A first clutch 470 is operable to engage the output shaft 468 to the range shaft 16 or to a drive gear 472 that is in meshing engagement with a driven gear 474 fixed to the countershaft 52a. A second clutch 476 can engage the output shaft 468 to the planetary carrier 42 of the range gear 40.

The hybrid transmissions 10, 110, 210, 310, 410 can be used in conjunction with an internal combustion engine (ICE) connected to the input shaft 12 through an engaging clutch. A reverse gear layer 34, 62, 64 is available in all architectures shown. The gear arrangements can be used in any combinations of range and splitter positions or removed completely to configure the transmission as an 8, 9, 10, 11 or 12-speed transmission. A gear arrangement for introducing the electric motor 20, 120, 220, 320, 420 drive torque enables motor speed reduction to allow for smaller high speed motors to be used. The motor drive train can connect the reduced motor speed to the front box countershaft 52a for torque fill in or can deliver drive torque to the range gear section 22c for maintaining power during shifting. With shift elements providing motor torque to the countershaft 52a, the motor can add power to the main-shaft through the front-box ratios. This provides optimal motor to internal combustion engine speed matching for optimal motor efficiency and power through all vehicle speeds.

In an automated manual transmission/hybrid transmission with multiple regimes, example 2×3×2, 2×4×2, 3×3×2 etc., the major challenge is to achieve full power-shift capability, utilizing full motor power in all gear shifts. Power-shift through the range shift (6-7-6 on a 2×3×2 transmission) is a common problem to solve. This architecture utilizes a planetary (or countershaft) range section where a power path from the motor direct to the output shaft is achieved without using the front-box components. Providing this power-path through engageable clutches enables the range synchronizer to be shifted while the motor is still connected to the output shaft.

The designs of the present disclosure allow the motor of the hybrid automated manual transmission to transmit power to the input-shaft OR counter-shaft, AND main-shaft AND output-shaft, while the internal combustion engine is disconnected from the output-shaft. The internal combustion engine is disconnected from the output-shaft to enable gear ratio changes between the input-shaft and output-shaft, typical of an automated manual transmission. The ability for the electric motor to transmit power to the three or more locations in the transmission provide full power-shift capability.

In operation, the driver commands the vehicle speed through the accelerator pedal. Road profile (grade), friction and aerodynamics dictate the torque required to maintain, accelerate, or decelerate (brake) the vehicle as per the driver's commands. All this information is fed into a virtual model in the form of a drive cycle & proportional integral controller. The torque required to follow the speed vs time profile of a drive cycle is called the demand torque. During gear upshifts, the engine torque profile ramps down, and once the shift is completed it ramps up. During this period, the motor starts providing torque with a target torque equal to the demand torque. Once shifting is completed, the motor torque ramps down to zero. The key here is that the ramp up of engine torque is generally slower than ramp down of the motor torque. Hence, the motor torque ramp down should begin only when certain conditions are met to avoid jerk. This condition is a factor of torque gap after upshift. The condition is that when upshift is completed and torque gap at the transmission output shaft falls below a value of 2000 Nm, motor torque ramps down. The threshold value of 2000 Nm may be optimized for smoother transition from motor to engine. The smaller the threshold, the longer is the duration of motor torque fill.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A hybrid automated manual transmission, comprising:
an input shaft having a first plurality of gears mounted thereon, the input shaft being drivingly engaged with an internal combustion engine by an input clutch;
a countershaft system having a second plurality of gears mounted thereon;
a main shaft coaxial with the input shaft and having a third plurality of gears mounted thereon, the first and third plurality of gears being in driving engagement with the second plurality of gears;
a range gear system selectively receives drive input from the main shaft and the countershaft system; and
an electric motor selectively engageable and disengageable with a countershaft of the countershaft system via a first clutch that engages the countershaft to a through shaft extending through a bore in the countershaft and two components of the range gear system.

2. A hybrid automated manual transmission, comprising:
an input shaft having a first plurality of gears mounted thereon, the input shaft being drivingly engaged with an internal combustion engine by an input clutch;
a countershaft system having a second plurality of gears mounted thereon;
a main shaft coaxial with the input shaft and having a third plurality of gears mounted thereon, the first and third plurality of gears being in driving engagement with the second plurality of gears;
a range gear system selectively receives drive input from the main shaft and the countershaft system; and
an electric motor selectively engageable with a countershaft of the countershaft system and two components of the range gear system, wherein the electric motor is concentric with the input shaft and includes a drive shaft having a drive gear engaged with a driven gear on a through shaft that extends through a bore in a countershaft of the countershaft system, the through shaft being selectively engageable with the countershaft and with the two components of the range gear system.

3. The hybrid automated manual transmission according to claim 2, wherein the two components of the range gear system are a planet carrier and a sun gear of the range gear system.

4. The hybrid automated manual transmission according to claim 3, wherein the planet carrier is connected to an output shaft of the transmission.

5. A hybrid automated manual transmission, comprising:
an input shaft having a first plurality of gears mounted thereon, the input shaft being drivingly engaged with an internal combustion engine by an input clutch;
a countershaft system having a second plurality of gears mounted thereon;
a main shaft coaxial with the input shaft and having a third plurality of gears mounted thereon, the first and third plurality of gears being in driving engagement with the second plurality of gears;
a range gear system selectively receives drive input from the main shaft and the countershaft system; and
an electric motor selectively engageable with a countershaft of the countershaft system and two components of the range gear system, wherein the electric motor is mounted at a forward end of the countershaft and includes a drive shaft having a drive gear engaged with a driven gear on a through shaft that extends through a bore in the countershaft, the through shaft being selectively engageable with the countershaft and with the two components of the range gear system.

6. The hybrid automated manual transmission according to claim 5, wherein the component of the range gear system is a planet carrier of the range gear system.

7. The hybrid automated manual transmission according to claim 6, wherein the planet carrier is connected to an output shaft of the transmission.

8. A hybrid automated manual transmission, comprising:
an input shaft having a first plurality of gears mounted thereon, the input shaft being drivingly engaged with an internal combustion engine by an input clutch;
a countershaft system having a second plurality of gears mounted thereon;
a main shaft coaxial with the input shaft and having a third plurality of gears mounted thereon, the first and third plurality of gears being in driving engagement with the second plurality of gears;
a range near system selectively receives drive input from the main shaft and the countershaft system; and
an electric motor selectively engageable with a countershaft of the countershaft system and two components of the range gear system, wherein the motor is located at a downstream side of a countershaft and includes a drive shaft connected to a drive gear that is selectively engageable with the countershaft and with the component of the range gear system.

9. The hybrid automated manual transmission according to claim 8, wherein the component of the range gear system is a planet carrier of the range gear system.

10. The hybrid automated manual transmission according to claim 9, wherein the planet carrier is connected to an output shaft of the transmission.

11. A hybrid automated manual transmission, comprising:
an input shaft having a first plurality of gears mounted thereon, the input shaft being drivingly engaged with an internal combustion engine by an input clutch;
a countershaft system having a second plurality of gears mounted thereon;
a main shaft coaxial with the input shaft and having a third plurality of gears mounted thereon, the first and third plurality of gears being in driving engagement with the second plurality of gears;
a range gear system selectively receives drive input from the main shaft and the countershaft system; and
an electric motor selectively engageable with a countershaft of the countershaft system and two components of the range gear system, wherein the electric motor is concentric with a range shaft of the range gear system.

12. The hybrid automated manual transmission according to claim 11, wherein the electric motor includes a motor output that is a ring gear of a planetary gear system that includes a planet carrier that is selectively engageable with the countershaft and the two components of the range gear system.

13. The hybrid automated manual transmission according to claim 12, wherein the electric motor includes an output shaft that is selectively engageable with the countershaft and the two components of the range gear system.

14. The hybrid automated manual transmission according to claim 13, wherein the component of the range gear system is a planet carrier of the range gear system.

15. The hybrid automated manual transmission according to claim 1, wherein the electric motor is selectively engageable and disengageable with the two components of the range gear system via the first clutch and a second clutch.

* * * * *